(12) United States Patent
Baik et al.

(10) Patent No.: US 7,034,104 B2
(45) Date of Patent: Apr. 25, 2006

(54) PROCESSES FOR PREPARING CONDUCTIVE MACROMOLECULAR POLYTHIOPHENES

(75) Inventors: Woon-Phil Baik, 10 Myongli Village, San 33-1 Nam-dong, Yongin-sl, Gyeonggi-do (KR) 449-030; Young-Sam Kim, Gyeonggi-do (KR); Jae-Han Park, Seoul (KR); Sang-Gook Jung, Gyeonggi-do (KR)

(73) Assignees: Myongji University, Seoul (KR); Woon-Phil Baik, Gyeonggi-do (KR)

( * ) Notice: Subject to any disclaimer, the term of this patent is extended or adjusted under 35 U.S.C. 154(b) by 7 days.

(21) Appl. No.: 10/728,088

(22) Filed: Dec. 5, 2003

(65) Prior Publication Data

US 2004/0171790 A1    Sep. 2, 2004

(30) Foreign Application Priority Data

Dec. 6, 2002    (KR) ............. 10-2002-0077465

(51) Int. Cl.
    *C08G 75/00*    (2006.01)
    *C08G 75/06*    (2006.01)
(52) U.S. Cl. ............. 528/486; 528/373; 528/377; 528/378; 528/397; 528/485
(58) Field of Classification Search ......... 528/373, 528/377, 378, 397, 485, 486
See application file for complete search history.

(56) References Cited

U.S. PATENT DOCUMENTS 4,959,430 A    9/1990    Jonas et al.
4,987,042 A    1/1991    Jonas et al.

OTHER PUBLICATIONS

Yamamoto et al, Neutral poly93,4-ethylenedioxythiophene-2,5-diyl)s: preparation by organometallic polycondensation and their unique p-doping behavior, 2001, Elsevier Science Ltd., Chem Abstract 136:200547.*
Tran-van et al, Fully undoped and soluble oligo(3,4-ethylenedioxythiophene)s: spectroscopic study and electrochemical characterization, 2001, Royal Society of Chemistry, Chem Abstract 135:107664.*

* cited by examiner

*Primary Examiner*—Duc Truong
(74) *Attorney, Agent, or Firm*—Nixon & Vanderhye P.C.

(57) ABSTRACT

The present invention relates to a process for preparing polythiophenes comprised of unit structures of the general formula 1:

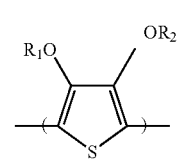

(1)

where $R_1$ and $R_2$ independently represent hydrogen or a $C_1$–$C_4$ alkyl group, or together represent an optionally substituted $C_1$–$C_4$ alkylene group, preferably an optionally alkyl-substituted methylene group, an optionally $C_1$–$C_4$ alkyl- or phenyl-substituted 1,2-ethylene group, a 1,3-propylene group or a 1,2-cyclohexylene group. More specifically, the process according to the present invention is characterized by the fact that it is performed by cationic polymerization from 2,5-dihalothiophene in the presence of an acid catalyst, such as Lewis acid, protic acid, oxygen acid, or polymeric acid. The conductivity of the resulting polythiophene is 255 S/cm under optimal conditions.

7 Claims, No Drawings

PROCESSES FOR PREPARING CONDUCTIVE MACROMOLECULAR POLYTHIOPHENES

FIELD OF THE INVENTION

The present invention relates to a process for preparing polythiophenes using acid catalysts. More specifically, it relates to a one-step process for manufacturing electrically conductive polythiophenes from 2,5-dihalothiophenes in the presence of acid catalysts such as Lewis acid, protic acid, organic acid or polymer acid in organic solvents or aqueous solution.

BACKGROUND OF THE INVENTION

Conductive polymers have the physical properties of general polymers as well as the electric, magnetic and optical properties of metals. Therefore, they have a wide range of applications in the fields of conventional metals and electronic materials.

Among the many interesting conductive polymers developed over the past 30 years, polyanilines, polypyrroles and polythiophenes have attracted the most attention and have been used in industrial applications and academic research.

While polyanilines are advantageous due to their low cost, they also show low heat stability and weak chemical resistance. In addition, the possible presence of benzidine moieties in the polymer backbone, which might yield carcinogenic products upon degradation, have limited their application. On the other hand, polythiophenes and polypyrroles are more environmentally friendly.

In particular, poly(3,4-alkylenedioxythiophene)s in which conductivity, thermal stability and chemical resistance are enhanced by the incorporation of alkoxy-substituents at the 3,4-positions of the thiophene ring have been developed by Bayer, Germany, and used in various applications. More specially, poly(3,4-ethylenedioxythiophene) has been shown to have relatively high conductivity higher than 100 S/cm. The oxygen substituents appear to reduce the bandgap in the conducting polymer and subject it to regular condensation at the 2,5-positions during polymerization. Thus, regular polycondensation and a low band gap can provide homogeneity to give high conductivity and thermal-and chemical-stability. Poly(3,4-alkylenedioxythiophene) has a wide range of applications, as follows:

1) Antistatic agent: to prevent static generated on the surface of plastic material or polymer, such as via a coating;
2) Condenser: for use as an alternative to electrolytes;
3) Coating on PCB(printed circuit board): to minimize environmental pollution by replacing conventional metal plating;
4) Organic EL(electro-luminescence) device: for use as a hole injecting layer on an ITO(indium tin oxide) substrate.

There is also growing interest in the development of synthetic processes, new polythiophene analogues and in-place industrial applications.

This invention relates to a new method for manufacturing conducting poly(3,4-alkylenedioxythiophene)s.

In general, polythiophene is prepared from the corresponding thiophene as a monomer. The known processes for the synthesis of polythiophene involve chemical or electrochemical polymerization. The typical chemical synthesis of conductive poly(3,4-alkylenedioxythiophene) involves the oxidative polymerization of 3,4-alkylenedioxythiophene with an oxidant (*Polym. Mater. Sci. Eng.* 1995, 72, 319; *Macromolecules*, 1996, 29, 7629; *Macromolecules*, 1997, 30, 2582; *Synth. Met.* 1999, 102, 967; U.S. Pat. No. 4,987, 042 (1991) and U.S. Pat. No. 4,959,430 (1990)).

For example, with 3,4-ethylenedioxythiophene and an oxidant in organic solvent, conductive poly(3,4-ethylenedioxythiophene) is obtained as a powder. When the polymerization of 3,4-ethylenedioxythiophene in the presence of oxidant is carried out in an aqueous solution using a surfactant, a colloid aqueous solution of the conductive polymer can be prepared(EP 440957, 1991; EP 553671, 1993; U.S. Pat. No. 5,792,558, 1996). The average diameter of poly(3,4-ethylenedioxythiophene) particles in the dispersions is within the range of 10 nm to 1 μm (U.S. Pat. 5,300,575, page 2).

Another chemical process for preparing poly(3,4-ethylenedioxythiophene) from 2,5-dichloro-3,4-ethylenedioxythiophene using a blended nickel catalyst, consisting of bis(1,5-cyclooctadiene)-nickel(0), Ni(cod)$_2$ and 2,2'-bipyridyl, has also been reported (Polymer, 2001, 42, 7229; Polymer, 2002, 43, 711). This method is not desirable for practical use in industrial applications that are expected to have a low manufacturing cost. In addition, Ni-catalyzed polycondensation of poly(3,4-ethylenedioxythiophene) requires an additional reaction process to give conductive properties, a so called doping process. Polymers show conductivity in the p-doped state, while they have no conductivity in the n-doped (=dedoped) state. Polythiophenes produced by oxidative chemical polymerization are inherently conductive because the oxidant serves as a dopant.

SUMMARY OF THE INVENTION

The present inventors have developed a simple one-step process for preparing p-doped conductive polythiophenes from 2,5-dihalothiophene in the presence of acid catalysts. The polythiophene powder has excellent inherent conductivity, higher than 255 S/cm under optimal conditions, and high thermal- and chemical-stability.

The object of the present invention is to provide a process for preparing conductive polythiophenes made up of structural units corresponding to the following the general formula (1):

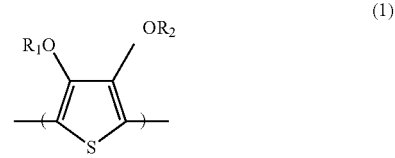

(1)

where, $R_1$ and $R_2$ individually represent hydrogen or a $C_1$–$C_4$ alkyl group, or together represent an optionally substituted $C_1$–$C_4$ alkylene group, preferably an optionally alkyl-substituted methylene group, an optionally $C_1$–$C_4$ alkyl or phenyl-substituted 1,2-ethylene group, a 1,3-propylene or a 1,2-cyclohexylene group, in the presence of polyanions.

DETAILED DESCRIPTION OF THE PREFERRED EMBODIMENTS

The process for preparing polythiophenes from 2,5-dihalothiophenes according to the present invention grants high conductivity by virtue of the acid catalyst that acts as a dopant. Acid-catalyzed polymerization has never been applied to the preparation of hetero-aromatic polythiophenes and polypyrroles.

The structural formula of 2,5-dihalothiophene, the starting monomer used in the present invention, is shown as the general formula (2):

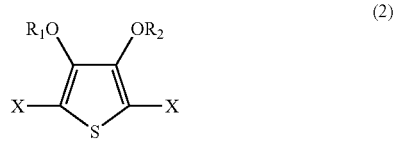

(2)

where $R_1$ and $R_2$ are described in The general formula (1), and X is I, Br or Cl.

The polymerization in the present invention is performed by dissolving 2,5-dihalothiophene[general formula (2)] and acid in solvent and vigorously stirring the mixture at an appropriate temperature until the polymerization reaction is complete.

The polymerization time is generally between 1 and 72 hours, depending on the size of the bath, the polymerization temperature, the amount of acid, and etc. The yield and conductivity may be improved by increasing the reaction time, more than 15 hours.

There are few limitations on the type of acid used. For practical reasons, it is preferable to use inexpensive and easy-to-handle acid. Specifically, the acid that can be used include boron salt, zinc salt, tin salt, aluminum salt and iron salt as Lewis acid, the boron salt is boron trifluoride, boron trifluoride dihydrate, boron trifluoride diethyl etherate, boron trifluoride-alcohol complex, boron trifluoride-methyl sulfide complex, boron trifluoride-phosphoric acid complex, boron trichloride, boron trichloride-methyl sulfide complex, boron tribromide, or boron tribromide-methyl sulfide complex, with the boron trifluoride being the most preferable; phosphoric acid, sulfuric acid, nitric acid, hypochlorous acid, HF, HCl, HBr, and HI as a protic acid, with phosphoric acid being the most preferable; carboxylic acid or sulfonic acid as a organic acid, with p-toluenesulfonic acid being the most preferable; and polystyrenesulfonic acid, polyacrylic acid, polymethacrylic acid, polymaleic acid and polyvinylsulfonic acid as polymeric acid, with polystyrenesulfonic acid being the most preferable. The acid described above can be used either alone or as a mixture with one or more other acid(s). The amount of acid is determined to be 1~20 equivalents per mol 2,5-dihalothiophene depending on the type of acid. When there is less than 1 equivalent, the reaction process is retarded to give a reaction product in low yield and low conductivity, while when there is more than 20 equivalents, the high acidity makes work-up difficult and increases the production cost. In practice, the acid is used, for example, in an excess of 3 to 7 equivalents per mol 2,5-dihalothiophene.

The solvents that can used in the present invention include $C_6$~$C_{20}$ aliphatic and aromatic hydrocarbons, halogen-containing hydrocarbons, ketones, ethers, $C_2$~$C_{20}$ alcohols, sulfoxides, amides and water. These solvents may be used alone or as a mixture of two or more solvents. More specifically, $C_6$~$C_{20}$ aliphatic and aromatic hydrocarbons include alkanes such as hexane, heptane, octane, nonane and decane and alkylbenzenes such as benzene, toluene, xylene, cumene, mesitylene, phenol and cresol; halogen-containing hydrocarbons include carbon tetrachloride, chloroform, dichloromethane, dichloroethane, dibromoethane, trichloroethane and tribromoethane; halobenzenes include dichlorobenzene, chlorobenzene and the like; ketones include acetone, propanone, butanone, pentanone, hexanone, heptanone, octanone and acetophenone; ethers include diethyl ether, tetrahydrofuran (THF), dipropyl ether, dibutyl ether, methyl butyl ether, diphenyl ether, dioxane, diglyme, diethylene glycol, ethylene glycol (EG) and the like; sulfoxides include dimethylsulfoxide (DMSO); and amides include N,N-dimethylformamide (DMF), N-methylacetamide (NMAA), N,N-dimethylacetamide (DMA), N-methylpropionamide (NMPA), N-methylpyrrolidinone (NMP) and the like. The most suitable solvent is selected depending on the type of acid catalyst used. When using a Lewis acid, organic acid or polymer acid, $C_6$~$C_{20}$ aliphatic and aromatic hydrocarbons, ethers and polar solvents such as DMSO, DMF, NMP or the like are preferred, while with inorganic acid, water or $C_2$~$C_{20}$ alcohol is preferred.

The reaction temperature of the polymerization according to the present invention is from 15° C. to 180° C., or the boiling temperature of the solvent used.

We will now describe the process according to the present invention in more detail.

Monomer of the general formula (2) and acid catalyst are added to the solvent, and the mixture is stirred vigorously with a homo-mixer at room temperature. To ensure the formation of polymer powder, the temperature is raised to complete the polymerization reaction. After the reaction is completed, a conductive polymer of the general formula (1) is obtained as a powder. The powder is washed with water, alcoholic solvent and nonpolar organic solvents to remove impurities. The resulting polythiophene powders have a range of conductivity from 19 to 255 S/cm depending on the reaction conditions, catalyst, solvent, and etc.

A free standing film of polythiophene polymerized according to the present invention was prepared by casting a monomer of the general formula (2) and inorganic acid in a volatile alcoholic solvent onto a glass substrate. The film was allowed to dry at around 150° C. for 24 hours in vacuum. The conductivity of the film layer is within the range of 25 to 35 S/cm.

According to the present invention, polythiophene is prepared by cationic polymerization in the presence of acid catalyst. Cationic polymerization is a kind of polymerization reaction: a cation is formed at the end of a monomer that has electrophilic properties, and then aromatic electrophilic substitution occurs to lead to subsequent condensation. Two strongly electron-donating substituents, alkoxy groups at the 3,4-positions, enhance the formation of cationic monomers. A narrow distribution of molecular weight, a so called low PD value (polydispersity index, PD=Mw/Mn), has been observed in the case of cationic polymerization relative to oxidative polymerization. Thus, the regular sequence and uniform molecular weight of polythiophenes prepared by the present invention can be retained to give excellent conductivity.

The procedure selected depends on external factors, such as, for example, the amount and kinds of acid or solvent. The following variations are intended to describe the invention, and in no way limit its scope.

EXAMPLE 1

Preparation of poly(3,4-ethylenedioxythiophene) from 2,5-dibromo-3,4-ethylenedioxythiophene by Lewis Acid ($BF_3$)

In a three-necked flask equipped with a homo-mixer, thermometer and condenser, 20.0 g of 2,5-dibromo-3,4-ethylenedioxythiophene was charged into 400 ml of toluene, and then 26.0 ml of boron trifluoride was added. The mixture was stirred at room temperature for 4 hours and heated to 100° C. for an additional 24 hours. The temperature was then lowered to room temperature to obtain powder via filtration. After washing with water, ethanol, and hexane, the powder was dried to give 12.9 g of poly(3,4-ethylenedioxythiophene) which had a conductivity of 255 S/cm (pressed pellet).

EXAMPLE 2

Preparation of poly(3,4-ethylenedioxythiophene) from 2,5-diiodo-3,4-ethylenedioxythiophene by Lewis Acid ($ZnCl_2$)

In a three-necked flask equipped with a homo-mixer, thermometer and condenser, 20.0 g of 2,5-diiodo-3,4-ethylenedioxythiophene was charged into 400 ml of xylene and 60.0 g of $ZnCl_2$ was added. The mixture was stirred at room temperature for 3 hours and then heated to 140° C. for an additional 20 hours. The techniques for purification, evaluating conductivity, and preparation of soluble powder were similar to those discussed in example 1. The 13.6 g of poly(3,4-ethylenedioxythiophene) obtained had a conductivity of 155 S/cm (pressed pellet).

EXAMPLE 3

Preparation of poly(3,4-dimethoxythiophene) from 2,5-dibromo-3,4-dimethoxythiophene by Lewis Acid ($BF_3$)

In a three-necked flask equipped with a homo-mixer, thermometer and condenser, 20.0 g of 2,5-dibromo-3,4-dimethoxythiophene was charged into 400 ml of toluene, and then 26.0 ml of boron trifluoride was added. The mixture was stirred at room temperature for 3 hours and then heated to 120° C. for an additional 24 hours. The reaction temperature was lowered to room temperature, to obtain a powder via filtration. After washing with water and ethanol three times, the powder was dried to give 9.2 g of poly(3,4-dimethoxythiophene), which has a conductivity of 180 S/cm (pressed pellet).

EXAMPLE 4

Preparation of poly(3,4-ethylenedioxythiophene) Using Inorganic Acid ($H_3PO_4$) in Aqueous Solution In a three-necked flask equipped with a homo-mixer and condenser, 3.0 g of 2,5-dibromo-3,4-ethylenedioxythiophene was charged into 78 ml of distilled water, and then 12.6 ml of $H_3PO_4$ (85%) was added. The mixture was heated to 85° C. for 9 hours. After the reaction temperature was lowered to around 10□, the reaction mixture was poured into a mixture of aqueous sodium bicarbonate (30%, 300 ml) and chloroform (600 ml). The resultant mixture was stirred for 9 hours and then heated to 100° C. for an additional 48 hours. The techniques for purification, evaluating conductivity, and preparing the soluble powder were similar to those discussed in an Example 1. The 1.1 g of poly(3,4-ethylenedioxythiophene) obtained had a conductivity of 57 S/cm.

EXAMPLE 5

Free-standing poly(3,4-ethylenedioxythiophene) Film

A 1.0 g portion of 2,5-dibromo-3,4-ethylenedioxythiophene and 10.6 ml of $H_3PO_4$ (85%) were added to 50 ml of ethanol. The resultant mixture was vigorously stirred at room temperature for 10 minutes and knife-coated onto glass using a hand coater (wet film thickness 25 um). The coated glass was placed in a vacuum oven and heated at 150° C. to completely evaporate the solvent. It was further heated at the same temperature for 48 hours. Films prepared in this manner had a conductivity of 35 S/cm.

EXAMPLE 6

Preparation of poly(3,4-ethylenedioxythiophene) Using a Mixture of Protic Acid ($H_3PO_4$) and Polymeric Acid (PSSA)

DMSO (100 ml) was added to a three-neck flask, and 2,5dibromo-3,4-ethylenedioxythiophene (3.0 g) and $H_3PO_4$ (85%) (5.0 ml) and polystyrenesulfonic acid (10.5 g) were added. As the reaction temperature was slowly raised to 140° C., the resultant mixture was vigorously stirred for 24 hours. After the reaction temperature was lowered to room temperature, the reaction mixture was neutralized with chloroform (600 ml) and aqueous sodium bicarbonate solution, and the resultant mixture was stirred for an additional 2 hours. The reaction mixture was filtered to obtain powder, which was washed with water and ethanol three times and dried to give conductive macromolecular poly(3,4-ethylenedioxythiophene) (0.40 g). The polymer was formed into a pellet had a conductivity of 19 S/cm.

According to the present invention, conductive polythiophene made up of structural units of The general formula (1) can be prepared by cationic polymerization from 2,5-dihalothiophene in the presence of acid catalyst. The conductive polythiophenes prepared by the present invention have good conductivities in the range of 19–255 S/cm.

What is claimed is:

1. A process for preparing conductive polythiophenes comprised of structural units of the general formula (1):

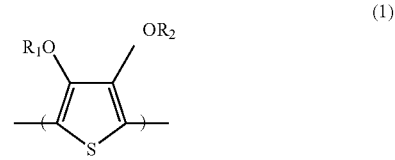

(1)

where $R_1$ and $R_2$ independently represent hydrogen or a $C_1$–$C_4$ alkyl group, or together represent an optionally substituted $C_1$–$C_4$ alkylene group, said method comprising acid catalysis of 2,5-dihalothiophene of the general formula (2):

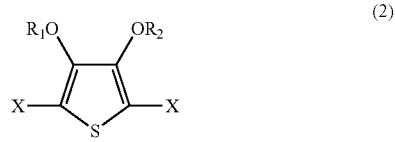

(2)

where $R_1$ and $R_2$ are described as above in the general formula (1), and X is a halogen atom selected from Cl, Br and I to produce said conductive polythiophenes;

said acid being a Lewis acid, a protic acid, an organic acid or a polymeric acid.

2. A process for preparing polythiophenes according to claim 1, wherein $R_1$ and $R_2$ independently represent methylene, 1,2-ethylene or 1,3-propylene.

3. A process for preparing polythiophenes according to claim 1, wherein the Lewis acid is a boron salt, zinc salt, tin salt or iron salt; the protic acid is phosphoric acid, sulfuric acid, nitric acid, hypochlorous acid, HF, HCl, HBr or HI; the organic acid is carboxylic acid or sulfonic acid; the polymeric acid is polystyrenesulfonic acid, polyacrylic acid, polymethacrylic acid, polymaleic acid or polyvinylsulfonic acid; and the catalyst comprises at least one acid.

4. A process for preparing polythiophenes according to claim 3, wherein the boron salt is boron trifluoride, boron trifluoride dihydrate, boron trifluoride diethyl etherate, boron trifluoride-alcohol complex, boron trifluoride-methyl sulfide complex, boron trifluoride-phosphoric acid complex, boron trichloride, boron trichloride-methyl sulfide complex, boron tribromide, or boron tribromide-methyl sulfide complex.

5. The process of claim 1 wherein where said optionally substituted $C_1$~$C_4$ alkylene group is an optionally alkyl-substituted methylene group, an optionally $C_1$~$C_4$ alky- or phenyl-substituted 1,2-ethylene group, a 1,3-propylene group or a 1,2-cyclohexylene group.

6. A process for preparing polythiophenes according to claim 5, wherein the Lewis acid is a boron salt, zinc salt, tin salt or iron salt; the protic acid is phosphoric acid, sulfuric acid, nitric acid, hypochlorous acid, HF, HCl, HBr or HI; the organic acid is carboxylic acid or sulfonic acid; the polymeric acid is polystyrenesulfonic acid, polyacrylic acid, polymethacrylic acid, polymaleic acid or polyvinylsulfonic acid; and the catalyst comprises at least one acid.

7. A process for preparing polythiophenes according to claim 6, wherein the boron salt is boron trifluoride, boron trifluoride dihydrate, boron trifluoride diethyl etherate, boron trifluoride-alcohol complex, boron trifluoride-methyl sulfide complex, boron trifluoride-phosphoric acid complex, boron trichloride, boron trichloride-methyl sulfide complex, boron tribromide, or boron tribromide-methyl sulfide complex.

* * * * *